US009534677B2

United States Patent
Kim et al.

(10) Patent No.: US 9,534,677 B2
(45) Date of Patent: Jan. 3, 2017

(54) HYDRAULIC CONTROL APPARATUS FOR HYDRAULIC TORQUE CONVERTER

(71) Applicants: Hyundai Motor Company, Seoul (KR); Kia Motors Corporation, Seoul (KR)

(72) Inventors: Hyun-Suk Kim, Seoul (KR); Yong Uk Shin, Suwon-si (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 164 days.

(21) Appl. No.: 14/513,976

(22) Filed: Oct. 14, 2014

(65) Prior Publication Data

US 2015/0167810 A1    Jun. 18, 2015

(30) Foreign Application Priority Data

Dec. 18, 2013    (KR) .................... 10-2013-0158823

(51) Int. Cl.
*F16H 45/02*    (2006.01)
*F16H 61/14*    (2006.01)

(52) U.S. Cl.
CPC ............ *F16H 45/02* (2013.01); *F16H 61/143* (2013.01); *B60Y 2306/05* (2013.01); *F16H 2045/0215* (2013.01); *F16H 2061/145* (2013.01)

(58) Field of Classification Search
CPC .............. F16H 2045/0215; F16H 45/02; F16H 2045/0205; F16H 2045/0221; F16H 2045/0278; F16H 61/143; F16H 2061/145
See application file for complete search history.

(56) References Cited

U.S. PATENT DOCUMENTS 8,899,394 B2 * 12/2014 Son ...................... F16H 61/143
192/3.29

FOREIGN PATENT DOCUMENTS

| JP | 3662968 B2 | 6/2005 |
| JP | 2012-219977 A | 11/2012 |
| KR | 10-2012-0020986 A | 3/2012 |

OTHER PUBLICATIONS

Machine translation of JP 3662968B2 downloaded from https://dossier1.j-platpat.inpit.go.jp on May 20, 2016.*

* cited by examiner

*Primary Examiner* — Richard Lorence
(74) *Attorney, Agent, or Firm* — Morgan, Lewis & Bockius LLP

(57) ABSTRACT

A hydraulic control apparatus for a hydraulic torque converter may include a lock-up switch valve and a slip switch valve. The lock-up switch valve may be connected to the first and second hydraulic lines of the hydraulic torque converter to control hydraulic pressure supplied to the disengagement-side oil chamber and the engagement-side oil chamber, and adapted to supply the hydraulic pressure exhausted from the engagement-side oil chamber to a lubricating portion or a cooling portion or to supply hydraulic pressure supplied from an additional hydraulic pressure supply source to the lubricating portion or the cooling portion. The slip switch valve may be disposed between the third hydraulic line of the hydraulic torque converter and the lock-up switch valve and adapted to selectively exhaust or not exhaust the hydraulic pressure supplied to the engagement-side oil chamber to the lock-up switch valve.

14 Claims, 5 Drawing Sheets

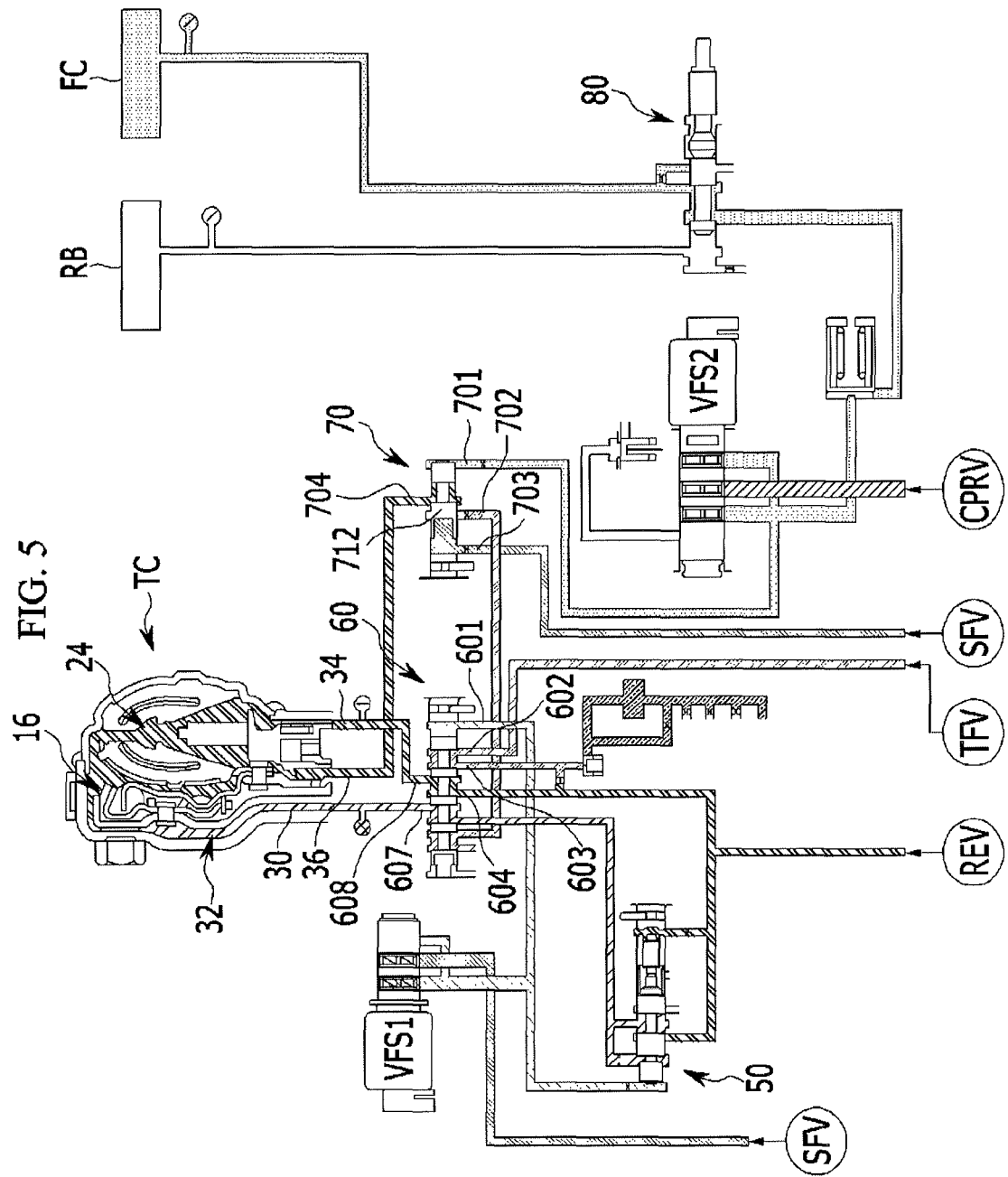

HYDRAULIC CONTROL APPARATUS FOR HYDRAULIC TORQUE CONVERTER

CROSS-REFERENCE TO RELATED APPLICATION

The present application claims priority of Korean Patent Application Number 10-2013-0158823 filed on Dec. 18, 2013, the entire contents of which application are incorporated herein for all purposes by this reference.

BACKGROUND OF INVENTION

Field of Invention

The present invention relates to a hydraulic control apparatus for a hydraulic torque converter applicable to an automatic transmission for a vehicle. More particularly, the present invention relates to a hydraulic control apparatus for a hydraulic torque converter that can control a damper clutch mounted in the hydraulic torque converter in a similar way to controlling a start clutch.

Description of Related Art

A torque converter applied to a vehicle includes a damper clutch for directly and mechanically transmitting torque. The damper clutch is disposed between a front cover being an input-side rotation member of the torque converter and a turbine being an output-side rotation member of the torque converter. A space between the front cover and the turbine is divided into a disengagement-side oil chamber close to the front cover and an engagement-side oil chamber close to the turbine.

Therefore, whether the damper clutch is operated or not is controlled by the difference between hydraulic pressure of the disengagement-side oil chamber and hydraulic pressure of the engagement-side oil chamber.

That is, if fluid in the disengagement-side oil chamber is drained and fluid is supplied to the engagement-side oil chamber, the hydraulic pressure of the engagement-side oil chamber increases compared with the disengagement-side oil chamber. Therefore, a friction member of the damper clutch is coupled to the front cover by friction.

On the contrary, if fluid in the engagement-side oil chamber is drained and fluid is supplied to the disengagement-side oil chamber, the hydraulic pressure of the disengagement-side oil chamber increases compared with engagement-side oil chamber. Therefore, the friction member of the damper clutch is spaced from the friction cover.

Since engagement/disengagement is simply controlled according to a conventional damper clutch, temperature may rise and durability may be deteriorated if the damper clutch is controlled in similar way to controlling a start clutch where slip occurs frequently.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

The present invention has been made in an effort to provide a hydraulic control apparatus for a hydraulic torque converter having advantages of controlling a damper clutch mounted in the hydraulic torque converter in a similar way to controlling a start clutch and enabling of lubricating and cooling the damper clutch.

Various aspects of the present invention provide a hydraulic control apparatus for a hydraulic torque converter which includes a first hydraulic line connected to a disengagement-side oil chamber, second and third hydraulic lines connected to an engagement-side oil chamber, and a damper clutch operated by hydraulic pressure of the disengagement-side oil chamber and hydraulic pressure of the engagement-side oil chamber. The hydraulic control apparatus may include: a lock-up switch valve connected to the first hydraulic line and the second hydraulic line of the hydraulic torque converter so as to control hydraulic pressure supplied to the disengagement-side oil chamber and the engagement-side oil chamber, and adapted to supply the hydraulic pressure exhausted from the engagement-side oil chamber to a lubricating portion or a cooling portion or to supply hydraulic pressure supplied from an additional hydraulic pressure supply source to the lubricating portion or the cooling portion; and a slip switch valve disposed between the third hydraulic line of the hydraulic torque converter and the lock-up switch valve and adapted to selectively exhaust or not exhaust the hydraulic pressure supplied to the engagement-side oil chamber to the lock-up switch valve.

The hydraulic pressure of the engagement-side oil chamber may be exhausted to the lock-up switch valve directly through the second hydraulic line or through the third hydraulic line and the slip switch valve.

The hydraulic control apparatus may further include: a damper clutch control solenoid valve adapted to supply control pressure to the lock-up switch valve; and a forward/reverse control solenoid valve adapted to control hydraulic pressure supplied to at least one friction element and to supply control pressure to the slip switch valve.

The hydraulic control apparatus may further include a torque converter pressure control valve controlled by line pressure supplied to the engagement-side oil chamber and the control pressure of the damper clutch control solenoid valve counteracting against the line pressure, and supplying control pressure to the lock-up switch valve or receiving the hydraulic pressure exhausted from the disengagement-side oil chamber.

The lock-up switch valve may be controlled by the control pressure of the damper clutch control solenoid valve and elastic force of an elastic member counteracting against the control pressure of the damper clutch control solenoid valve.

The lock-up switch valve may include: a valve body including a first port connected to the damper clutch control solenoid valve, a second port connected to the additional hydraulic pressure supply source, a third port connected to the lubricating portion or the cooling portion, a fourth port receiving line pressure, a fifth port connected to the torque converter pressure control valve, a sixth port selectively connecting the fifth port to the slip switch valve, a seventh port connected to the first hydraulic line of the hydraulic torque converter, an eighth port connected to the second hydraulic line of the hydraulic torque converter, and a first exhaust port selectively connected to the sixth port; a valve spool including a first land on which the control pressure supplied to the first port is exerted, a second land selectively connecting the second port and the third port, a third land selectively connecting the fourth port to the seventh port or the eighth port, a fourth land, together with the third land, connecting the fourth port and the seventh port or the seventh port and the fifth port, a fifth land, together with the fourth land, selectively connecting the sixth port to the fifth port or the first exhaust port; and the elastic member disposed between the fifth land and the valve body.

The slip switch valve may be controlled by the control pressure of the forward/reverse control solenoid valve and by control pressure counteracting against the control pressure of the forward/reverse control solenoid valve and supplied from an additional control pressure supply source.

The slip switch valve may include: a valve body including a first port connected to the forward/reverse control solenoid valve, a second port connected to the lock-up switch valve, a third port connected to the additional control pressure supply source, and a fourth port connected to the third hydraulic line of the hydraulic torque converter; and a valve spool including a first land on which the control pressure supplied to the first port is exerted, and a second land, together with the first land, connecting the second port and the fourth port and on which the control pressure supplied to the third port is exerted.

A hydraulic control apparatus according to various other aspects of the present invention may include: a lock-up switch valve connected to the first hydraulic line and the second hydraulic line of the hydraulic torque converter so as to control hydraulic pressure supplied to the disengagement-side oil chamber and the engagement-side oil chamber, and adapted to supply the hydraulic pressure exhausted from the engagement-side oil chamber to a lubricating portion or a cooling portion or to supply hydraulic pressure supplied from an additional hydraulic pressure supply source to the lubricating portion or the cooling portion; a slip switch valve adapted to selectively exhaust or not exhaust the hydraulic pressure supplied to the engagement-side oil chamber to the lock-up switch valve; a damper clutch control solenoid valve adapted to supply control pressure to the lock-up switch valve; and a forward/reverse control solenoid valve adapted to control hydraulic pressure supplied to at least one friction element and to supply control pressure to the slip switch valve.

The hydraulic pressure of the engagement-side oil chamber may be exhausted to the lock-up switch valve directly through the second hydraulic line or through the third hydraulic line and the slip switch valve.

The hydraulic control apparatus may further include a torque converter pressure control valve controlled by line pressure supplied to the engagement-side oil chamber and the control pressure of the damper clutch control solenoid valve counteracting against the line pressure, and supplying control pressure to the lock-up switch valve or receiving the hydraulic pressure exhausted from the disengagement-side oil chamber.

The lock-up switch valve may be controlled by the control pressure of the damper clutch control solenoid valve and elastic force of an elastic member counteracting against the control pressure of the damper clutch control solenoid valve.

The lock-up switch valve may include: a valve body including a first port connected to the damper clutch control solenoid valve, a second port connected to the additional hydraulic pressure supply source, a third port connected to the lubricating portion or the cooling portion, a fourth port receiving line pressure, a fifth port connected to the torque converter pressure control valve, a sixth port selectively connecting the fifth port to the slip switch valve, a seventh port connected to the first hydraulic line of the hydraulic torque converter, an eighth port connected to the second hydraulic line of the hydraulic torque converter, and a first exhaust port selectively connected to the sixth port; a valve spool including a first land on which the control pressure supplied to the first port is exerted, a second land selectively connecting the second port and the third port, a third land selectively connecting the fourth port to the seventh port or the eighth port, a fourth land, together with the third land, connecting the fourth port and the seventh port or the seventh port and the fifth port, a fifth land, together with the fourth land, selectively connecting the sixth port to the fifth port or the first exhaust port; and the elastic member disposed between the fifth land and the valve body.

The slip switch valve may be controlled by the control pressure of the forward/reverse control solenoid valve and by control pressure counteracting against the control pressure of the forward/reverse control solenoid valve and supplied from an additional control pressure supply source.

The slip switch valve may include: a valve body including a first port connected to the forward/reverse control solenoid valve, a second port connected to the lock-up switch valve, a third port connected to the additional control pressure supply source, and a fourth port connected to the third hydraulic line of the hydraulic torque converter; and a valve spool including a first land on which the control pressure supplied to the first port is exerted, and a second land, together with the first land, connecting the second port and the fourth port and on which the control pressure supplied to the third port is exerted.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 5 is a schematic diagram illustrating flow of hydraulic pressure in an exemplary hydraulic control apparatus according to the present invention at lock-up on state of a damper clutch.

DETAILED DESCRIPTION

Figure 1:
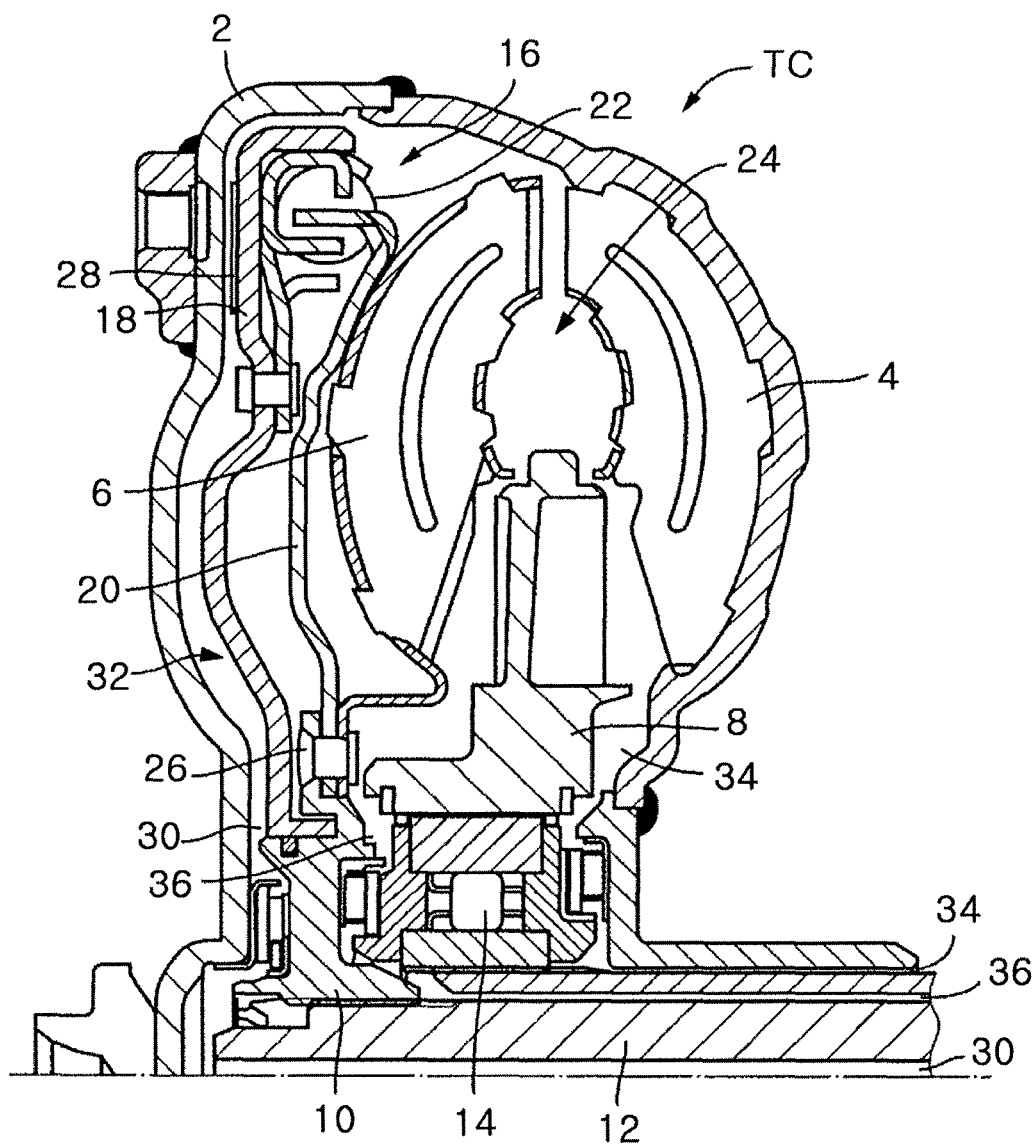
FIG. 1 is a cross-sectional view of a hydraulic torque converter to which an exemplary hydraulic control apparatus of the present invention is applicable.

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Description of components that are not necessary for explaining the present exemplary embodiment will be omitted, and the same constituent elements are denoted by the same reference numerals in this specification. In the detailed description, ordinal numbers are used for distinguishing constituent elements having the same terms, and have no specific meanings.

FIG. 1 is a cross-sectional view of a hydraulic torque converter to which various embodiments of the present invention is applicable. Referring to FIG. 1, a torque converter TC includes a front cover 2, an impeller 4, a turbine 6, and a stator 8.

The front cover 2 is connected to a crankshaft of an engine so as to rotate with the engine. The impeller 4 is connected to the front cover 2 so as to rotate with the front cover 2.

The turbine 6 is disposed to face the impeller 4, and is rotated by fluid supplied from the impeller 4 so as to drive a driven shaft 12 that is an input shaft of a transmission through a turbine hub 10.

The stator 8 is disposed between the impeller 4 and the turbine 6, and is adapted to rotate only in one direction by a one-way clutch 14. The stator 8 changes flow direction of fluid (automatic transmission oil) flowing out from the turbine 6 and delivers the fluid to the impeller 4. The stator 8 has the same rotation axis as the front cover 2.

In addition, a damper clutch 16 for directly connecting the engine with the transmission is disposed between the front cover 2 and the turbine 6. The damper clutch 16 includes a clutch piston 18, a damper 20, and a coil spring 22.

The clutch piston 18 is disposed between the turbine 6 and the front cover 2, and is movable in an axial direction. That is, the clutch piston 18 is movable toward the front cover 2 or away from the front cover 2.

In addition, an engagement-side oil chamber 24 is formed in a space between the clutch piston 18 and the impeller 4 (that is, the space between the impeller 4 being an input element and the turbine 6 being an output element).

The damper 20 is disposed between the clutch piston 18 and the turbine 6, and an internal circumferential portion of the damper 20 is fixed to the turbine 6 and the turbine hub 10 by a rivet 26. Therefore, if the damper 20 rotates, the turbine hub 10 and the driven shaft 12 also rotate.

The coil spring 22 is disposed between the clutch piston 18 and an external circumferential portion of the damper 20, and allows the clutch piston 18 and the damper 20 to rotate relatively within a predetermined range. The coil spring 22 rotates with the clutch piston 18 and the damper 20.

The clutch piston 18 has a surface facing the front cover 2, and a friction member 28 is attached to the surface. The friction member 28 is made of a material having high durability and abrasion resistance and low thermal conduction rate or low thermal conductivity.

A first hydraulic line 30 is formed between the front cover 2 and the turbine hub 10, and is connected to the disengagement-side oil chamber 32 formed at the space between the front cover 2 and the clutch piston 18.

In addition, a second hydraulic line 34 is formed between the impeller 4 and the stator 8, and a third hydraulic line 36 is formed between the turbine hub 10 and the stator 8.

The second hydraulic line 34 and the third hydraulic line 36 are connected to the engagement-side oil chamber 24 and are connected to each other through the engagement-side oil chamber 24.

The damper clutch 16 of the torque converter TC is a hydraulic clutch connecting the turbine 6 to the front cover 2 by hydraulic pressure difference between the engagement-side oil chamber 24 and the disengagement-side oil chamber 32. If the damper clutch 16 is engaged completely, the impeller 4 and the turbine 6 rotate integrally.

A hydraulic control apparatus for controlling the damper clutch 16 will be described in further detail with reference to the accompanying drawings.

Figure 2:
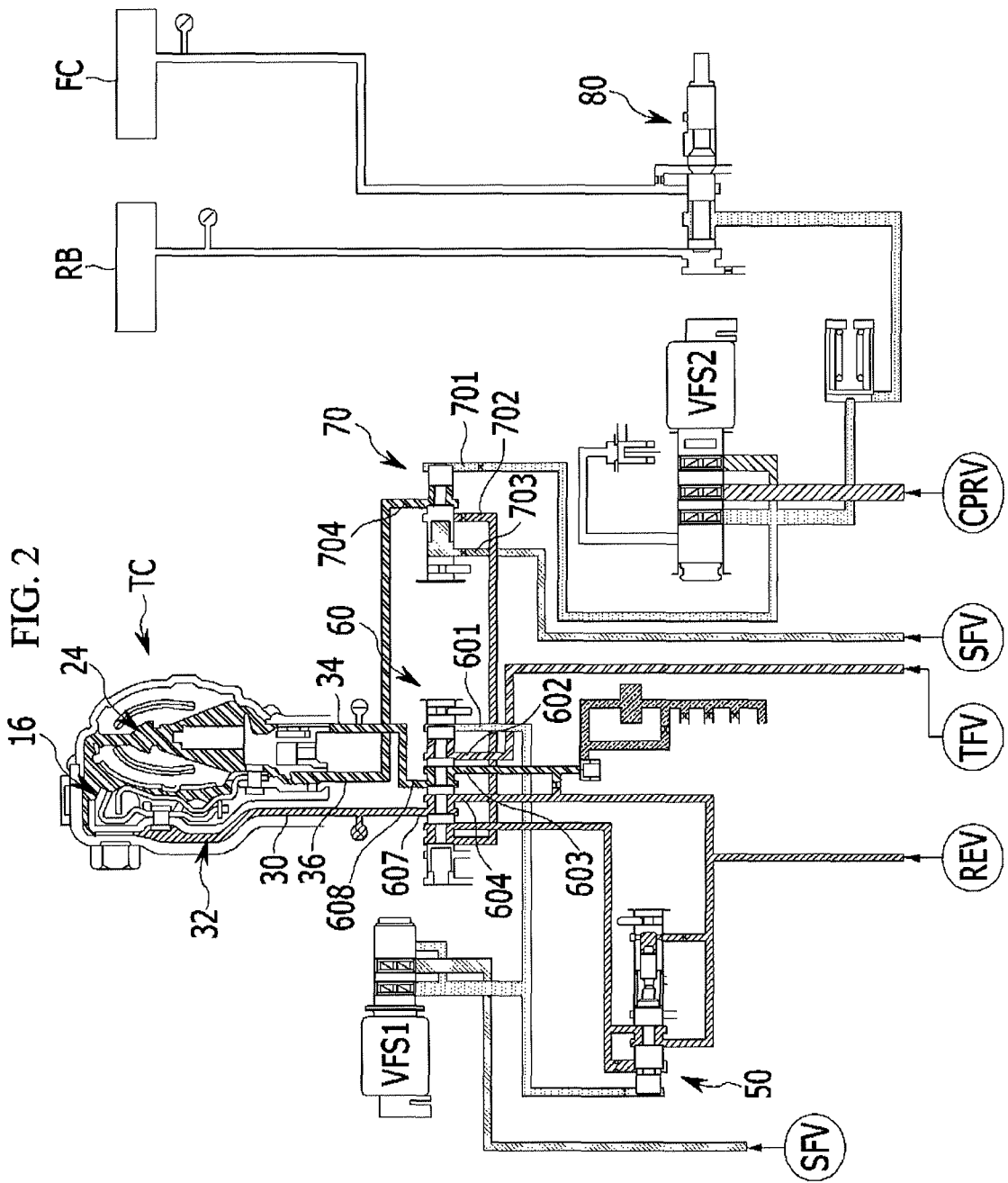
FIG. 2 is a schematic diagram illustrating flow of hydraulic pressure in an exemplary hydraulic control apparatus according to the present invention at a neutral (N) state.

FIG. 2 is a schematic diagram illustrating flow of hydraulic pressure in a hydraulic control apparatus according to various embodiments of the present invention at a neutral state. Referring to FIG. 2, the hydraulic pressure supplied to or exhausted from the hydraulic torque converter TC is controlled by a torque converter pressure control valve 50, a lock-up switch valve 60, a slip switch valve 70, a damper clutch control solenoid valve VFS1, and a forward/reverse control solenoid valve VFS2.

The torque converter pressure control valve 50 is a spool valve, is controlled by hydraulic pressure supplied from a line regulator valve REV controlling line pressure and control pressure supplied from the damper clutch control solenoid valve VFS1, and controls engaging pressure and releasing pressure of the damper clutch 16.

The lock-up switch valve 60 is a spool valve, is controlled by the control pressure supplied from the damper clutch control solenoid valve VFS1, and switches hydraulic lines in order to supply hydraulic pressure to the damper clutch 16 or to exhaust hydraulic pressure from the damper clutch 16.

The slip switch valve 70 is a spool valve, is controlled by control pressure of the forward/reverse control solenoid valve VFS2 and control pressure supplied from a solenoid feed valve SFV and counteracting against the control pressure of the forward/reverse control solenoid valve VFS2, and selectively exhausts operating hydraulic pressure of the damper clutch 16.

The damper clutch control solenoid valve VFS1 is a proportional control solenoid valve and supplies the control pressure to the torque converter pressure control valve 50 and the lock-up switch valve 60 by controlling the hydraulic pressure supplied from the solenoid feed valve SFV.

The forward/reverse control solenoid valve VFS2 is a proportional control solenoid valve and controls and supplies hydraulic pressure supplied from a clutch pressure control valve CPRV to the slip switch valve 70 and a manual valve 80.

The hydraulic pressure supplied to the manual valve 80 is supplied to friction elements (e.g., a forward clutch FC or a reverse brake RB) according to forward/reverse selection of a driver.

Hereinafter, the lock-up switch valve 60 and the slip switch valve 70 will be described in further detail.

Figure 3:
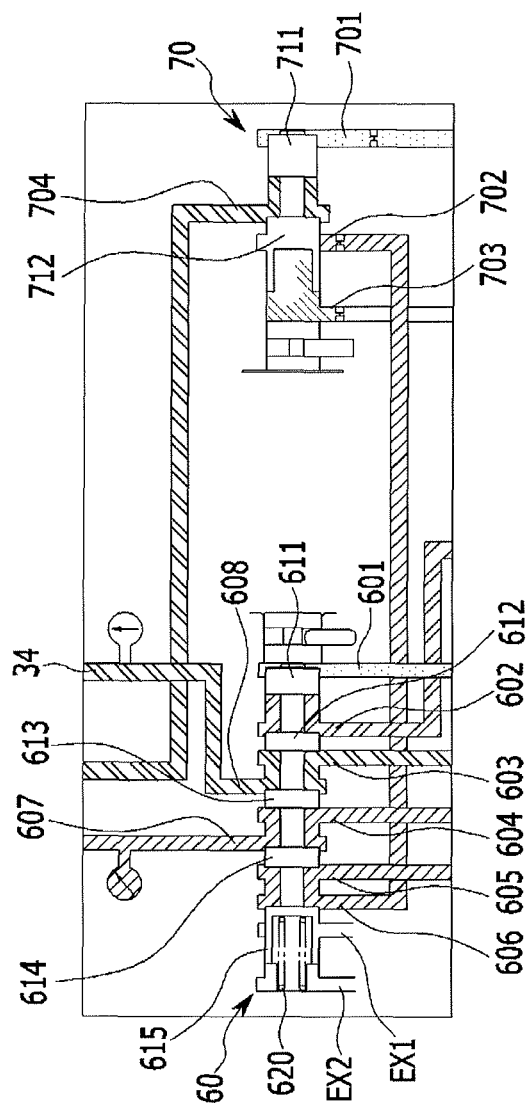
FIG. 3 is a cross-sectional view of a lock-up switch valve and a slip switch valve used in an exemplary hydraulic control apparatus according to the present invention.

Referring to FIG. 3, the lock-up switch valve 60 includes a valve body formed of a plurality of ports such as first, second, third, fourth, fifth, sixth, seventh, and eighth ports 601, 602, 603, 604, 605, 606, 607, and 608 and first and second exhaust ports EX1 and EX2, a valve spool formed of a plurality of lands such as first, second, third, fourth, and fifth lands 611, 612, 613, 614, and 615, and one elastic member 620.

The first port 601 receives the control pressure supplied from the damper clutch control solenoid valve VFS1.

The second port 602 is connected to a torque converter feed valve TFV. The torque converter feed valve TFV controls hydraulic pressure released from the hydraulic torque converter TC.

The third port 603 is communicated with a lubricating portion and/or a cooling portion and supplies to the lubricating portion and/or the cooling portion the hydraulic pressure exhausted from the engagement-side oil chamber 24 of the hydraulic torque converter TC or the hydraulic pressure supplied to the second port 602.

The fourth port 604 is connected to the line regulator valve REV and receives the hydraulic pressure supplied to the engagement-side oil chamber 24 and/or the disengagement-side oil chamber 32 of the hydraulic torque converter TC.

The fifth port 605 is connected to the torque converter pressure control valve 50, and receives the control pressure from the torque converter pressure control valve 50 or delivers the hydraulic pressure exhausted from the disengagement-side oil chamber 32 of the hydraulic torque converter to the torque converter pressure control valve 50.

The sixth port 606 is selectively connected to the fifth port 605 and is always connected to the slip switch valve 70. The sixth port 606 supplies the hydraulic pressure supplied from the torque converter pressure control valve 50 to the slip switch valve 70 or receives the hydraulic pressure from the slip switch valve 70.

The seventh port 607 is connected to the first hydraulic line 30 of the hydraulic torque converter TC and is selectively connected to the fourth port 604 or the fifth port 605. The seventh port 607 supplies the hydraulic pressure of the fourth port 604 to the disengagement-side oil chamber 32 through the first hydraulic line 30 or supplies the hydraulic pressure exhausted from the disengagement-side oil chamber 32 to the fifth port 605.

The eighth port 608 is connected to the second hydraulic line 34 of the hydraulic torque converter TC and is selectively connected to the third port 603 or the fourth port 604. The eighth port 608 supplies the hydraulic pressure of the fourth port 604 to the engagement-side oil chamber 24 through the second hydraulic line 34 or supplies the hydraulic pressure exhausted from the engagement-side oil chamber 24 to the third port 603.

The first exhaust port EX1 is selectively connected to the sixth port 606 and exhausts the hydraulic pressure supplied from the slip switch valve 70. The second exhaust port EX2 exhausts leaked hydraulic pressure.

The control pressure supplied to the first port 601 is exerted on the first land 611. The second land 612 selectively connects or disconnects the second port 602 and the third port 603. The third land 613 selectively connects the fourth port 604 to the seventh port 607 or the eighth port 608. The fourth land 614, together with the third land 613, connects the fourth port 614 and the seventh port 607 or connects the seventh port 607 and the fifth port 605. The fifth land 615, together with the fourth land 614, selectively connects the sixth port 616 to the fifth port 615 or the first exhaust port EX1.

The elastic member 620 may be a coil spring, is disposed between the fifth land 615 and valve body, and provides elastic force always pushing the valve spool toward the first port 601.

The slip switch valve 70 includes a valve body formed of a plurality of ports such as first, second, third, and fourth ports 701, 702, 703, and 704 and a valve spool formed of a plurality of lands such as first and second lands 711 and 712.

The first port 701 receives the control pressure from the forward/reverse control solenoid valve VFS2. The second port 702 is connected to the sixth port 606 of the lock-up switch valve 60. The third port 703 is connected to the solenoid feed valve SFV and receives control pressure. The fourth port 704 is connected to the third hydraulic line 36 of the hydraulic torque converter TC and is selectively connected to the second port 702.

The control pressure supplied to the first port 701 exerts on the first land 711. The second land 712, together with the first land 711, selectively connects the second port 702 and the fourth port 704. The control pressure supplied to the third port 703 is exerted on the second land 712.

At a neutral (N range) state, as shown in FIG. 2, the line pressure supplied to the line regulator valve REV is supplied to the disengagement-side oil chamber 32 through the fourth and seventh ports 604 and 607 of the lock-up switch valve 60 and the first hydraulic line 30. Therefore, the damper clutch 16 is not engaged.

In addition, the hydraulic pressure supplied to the disengagement-side oil chamber 32 is supplied to the lubricating portion or the cooling portion through the engagement-side oil chamber 24, the second hydraulic line 34, and the eighth and third ports 608 and 603 of the lock-up switch valve 60.

Figure 4:
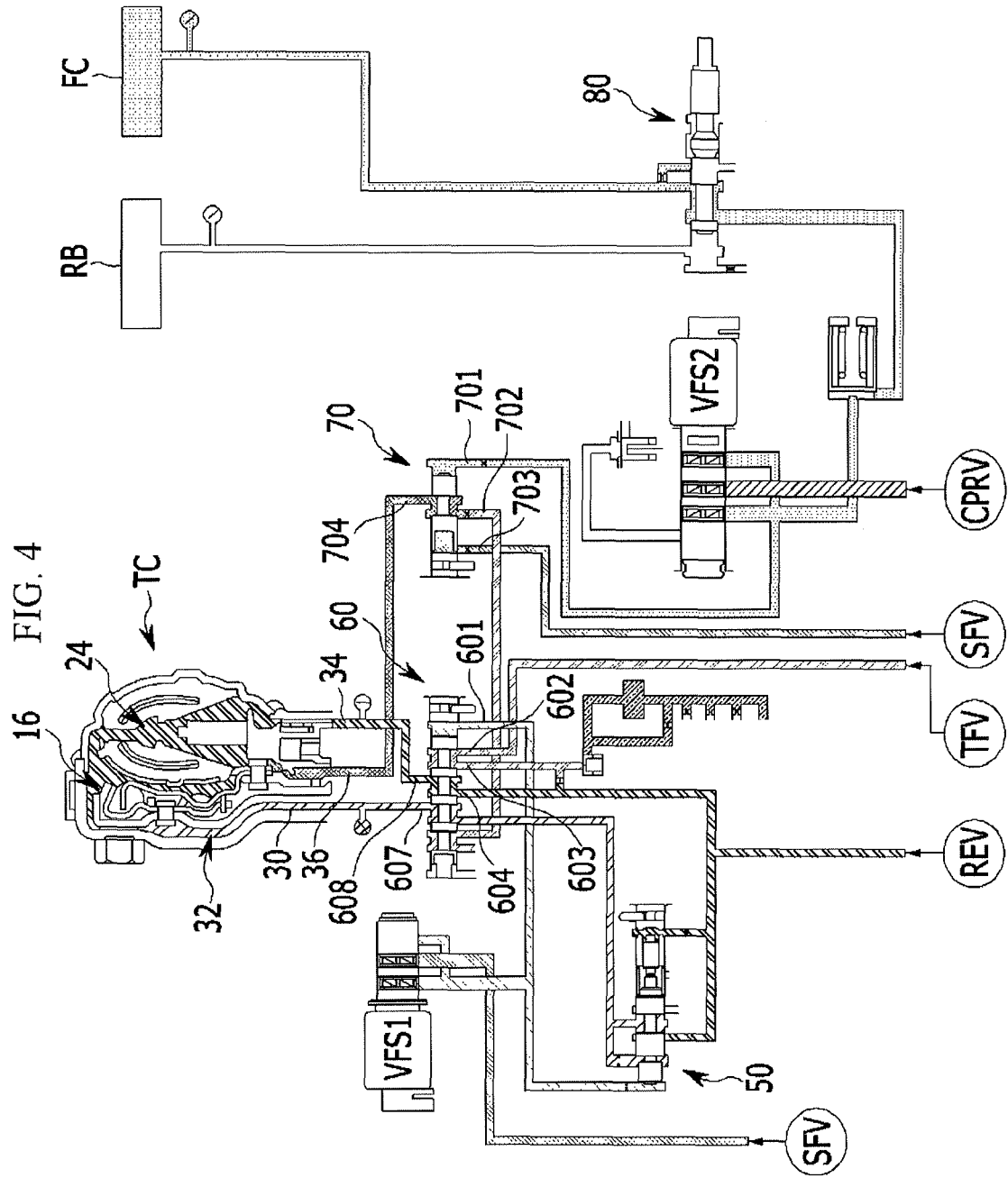
FIG. 4 is a schematic diagram illustrating flow of hydraulic pressure in an exemplary hydraulic control apparatus according to the present invention during starting control of a damper clutch.

FIG. 4 is a schematic diagram illustrating flow of hydraulic pressure in a hydraulic control apparatus according to various embodiments of the present invention during starting control of a damper clutch (e.g., if cooling and lubrication are necessary).

Referring to FIG. 4, if the driver manipulates a select lever and selects forward range, the hydraulic pressure is supplied to the forward clutch FC and starting control of the damper clutch 16 begins.

At this time, the valve spool of the lock-up switch valve 60 is moved to the left in the drawing by the control pressure of the damper clutch control solenoid valve VFS1, and the valve spool of the slip switch valve 70 is moved to the left in the drawing since the hydraulic pressure supplied from the clutch pressure control valve CPRV becomes maximum pressure.

At this state, the line pressure of the line regulator valve REV is supplied to the engagement-side oil chamber 24 through the fourth and eighth ports 604 and 608 of the lock-up switch valve 60 and the second hydraulic line 34. Therefore, the damper clutch 16 is engaged.

In addition, the hydraulic pressure supplied to the engagement-side oil chamber 24 is exhausted through the third hydraulic line 36, the fourth and second ports 704 and 702 of the slip switch valve 70, and the sixth port 606 and the first exhaust port EX1 of the lock-up switch valve 60.

That is, during starting control of the damper clutch 16, flow of oil occurs in the engagement-side oil chamber 24 and heat generated by slip of the damper clutch 16 can be cooled.

In addition, the hydraulic pressure supplied from the torque converter feed valve TFV is supplied to the lubricating portion or the cooling portion though the second and third ports 602 and 603 of the lock-up switch valve 60.

FIG. 5 is a schematic diagram illustrating flow of hydraulic pressure in a hydraulic control apparatus according to various embodiments of the present invention at lock-up on state of a damper clutch.

Referring to FIG. 5, when the damper clutch 16 is locked-up on after the damper clutch 16 is started, lower hydraulic pressure is supplied to the forward clutch FC, and accordingly, the control pressure supplied to the slip switch valve 70 is also lowered.

Therefore, the valve spool of the slip switch valve 70 is moved to the right so as to disconnect the second port 702 and the fourth port 704, and flow of oil does not occur in the engagement-side oil chamber 24.

In addition, the hydraulic pressure of the torque converter feed valve TFV is supplied to the lubricating portion or the cooling portion.

According to various embodiments of the present invention, three hydraulic lines are formed in the hydraulic torque converter TC and oil flow occurs in the hydraulic torque converter TC during the starting control. Therefore, the damper clutch 16 can be cooled and can be used as a starting clutch.

Compared with conventional arts in which the damper clutch 16 is not operated at the stating, fuel economy may be improved.

In addition, fluid supplied to the hydraulic torque converter TC is supplied to the lubricating portion or the cooling portion if the damper clutch 16 is not operated, and fluid is supplied to the lubricating portion or the cooling portion through an additional hydraulic line if the damper clutch 16 is operated. Therefore, lubrication and cooling can be smoothly done.

For convenience in explanation and accurate definition in the appended claims, the terms "internal" or "external", "front" or "rear", and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A hydraulic control apparatus for a hydraulic torque converter which includes a first hydraulic line connected to a disengagement-side oil chamber, second and third hydraulic lines connected to an engagement-side oil chamber, and a damper clutch operated by hydraulic pressure of the disengagement-side oil chamber and hydraulic pressure of the engagement-side oil chamber, the hydraulic control apparatus comprising:
    a lock-up switch valve connected to the first hydraulic line and the second hydraulic line of the hydraulic torque converter so as to control hydraulic pressure supplied to the disengagement-side oil chamber and the engagement-side oil chamber, and adapted to supply the hydraulic pressure exhausted from the engagement-side oil chamber to a lubricating portion or a cooling portion or to supply hydraulic pressure supplied from an additional hydraulic pressure supply source to the lubricating portion or the cooling portion;
    a slip switch valve disposed between the third hydraulic line of the hydraulic torque converter and the lock-up switch valve and adapted to selectively exhaust or not exhaust the hydraulic pressure supplied to the engagement-side oil chamber to the lock-up switch valve;
    a damper clutch control solenoid valve adapted to supply control pressure to the lock-up switch valve; and
    a forward/reverse control solenoid valve adapted to control hydraulic pressure supplied to at least one friction element and to supply control pressure to the slip switch valve.

2. The hydraulic control apparatus of claim 1, wherein the hydraulic pressure of the engagement-side oil chamber is exhausted to the lock-up switch valve directly through the second hydraulic line or through the third hydraulic line and the slip switch valve.

3. The hydraulic control apparatus of claim 1, further comprising:
    a torque converter pressure control valve controlled by line pressure supplied to the engagement-side oil chamber and the control pressure of the damper clutch control solenoid valve counteracting against the line pressure, and supplying control pressure to the lock-up switch valve or receiving the hydraulic pressure exhausted from the disengagement-side oil chamber.

4. The hydraulic control apparatus of claim 1, wherein the lock-up switch valve is controlled by the control pressure of the damper clutch control solenoid valve and elastic force of an elastic member counteracting against the control pressure of the damper clutch control solenoid valve.

5. The hydraulic control apparatus of claim 4, wherein the lock-up switch valve comprises:
    a valve body including a first port connected to the damper clutch control solenoid valve, a second port connected to the additional hydraulic pressure supply source, a third port connected to the lubricating portion or the cooling portion, a fourth port receiving line pressure, a fifth port connected to the torque converter pressure control valve, a sixth port selectively connecting the fifth port to the slip switch valve, a seventh port connected to the first hydraulic line of the hydraulic torque converter, an eighth port connected to the second hydraulic line of the hydraulic torque converter, and a first exhaust port selectively connected to the sixth port;
    a valve spool including a first land on which the control pressure supplied to the first port is exerted, a second land selectively connecting the second port and the third port, a third land selectively connecting the fourth port to the seventh port or the eighth port, a fourth land, together with the third land, connecting the fourth port and the seventh port or the seventh port and the fifth port, a fifth land, together with the fourth land, selectively connecting the sixth port to the fifth port or the first exhaust port; and
    the elastic member disposed between the fifth land and the valve body.

6. The hydraulic control apparatus of claim 1, wherein the slip switch valve is controlled by the control pressure of the forward/reverse control solenoid valve and by control pressure counteracting against the control pressure of the forward/reverse control solenoid valve and supplied from an additional control pressure supply source.

7. The hydraulic control apparatus of claim 6, wherein the slip switch valve comprises:
    a valve body including a first port connected to the forward/reverse control solenoid valve, a second port connected to the lock-up switch valve, a third port connected to the additional control pressure supply source, and a fourth port connected to the third hydraulic line of the hydraulic torque converter; and
    a valve spool including a first land on which the control pressure supplied to the first port is exerted, and a second land, together with the first land, connecting the second port and the fourth port and on which the control pressure supplied to the third port is exerted.

8. A hydraulic control apparatus for a hydraulic torque converter which includes a first hydraulic line connected to a disengagement-side oil chamber, second and third hydraulic lines connected to an engagement-side oil chamber, and a damper clutch operated by hydraulic pressure of the disengagement-side oil chamber and hydraulic pressure of the engagement-side oil chamber, the hydraulic control apparatus comprising:
- a lock-up switch valve connected to the first hydraulic line and the second hydraulic line of the hydraulic torque converter so as to control hydraulic pressure supplied to the disengagement-side oil chamber and the engagement-side oil chamber, and adapted to supply the hydraulic pressure exhausted from the engagement-side oil chamber to a lubricating portion or a cooling portion or to supply hydraulic pressure supplied from an additional hydraulic pressure supply source to the lubricating portion or the cooling portion;
- a slip switch valve adapted to selectively exhaust or not exhaust the hydraulic pressure supplied to the engagement-side oil chamber to the lock-up switch valve;
- a damper clutch control solenoid valve adapted to supply control pressure to the lock-up switch valve; and
- a forward/reverse control solenoid valve adapted to control hydraulic pressure supplied to at least one friction element and to supply control pressure to the slip switch valve.

9. The hydraulic control apparatus of claim 8, wherein the hydraulic pressure of the engagement-side oil chamber is exhausted to the lock-up switch valve directly through the second hydraulic line or through the third hydraulic line and the slip switch valve.

10. The hydraulic control apparatus of claim 8, further comprising:
- a torque converter pressure control valve controlled by line pressure supplied to the engagement-side oil chamber and the control pressure of the damper clutch control solenoid valve counteracting against the line pressure, and supplying control pressure to the lock-up switch valve or receiving the hydraulic pressure exhausted from the disengagement-side oil chamber.

11. The hydraulic control apparatus of claim 8, wherein the lock-up switch valve is controlled by the control pressure of the damper clutch control solenoid valve and elastic force of an elastic member counteracting against the control pressure of the damper clutch control solenoid valve.

12. The hydraulic control apparatus of claim 11, wherein the lock-up switch valve comprises:
- a valve body including a first port connected to the damper clutch control solenoid valve, a second port connected to the additional hydraulic pressure supply source, a third port connected to the lubricating portion or the cooling portion, a fourth port receiving line pressure, a fifth port connected to the torque converter pressure control valve, a sixth port selectively connecting the fifth port to the slip switch valve, a seventh port connected to the first hydraulic line of the hydraulic torque converter, an eighth port connected to the second hydraulic line of the hydraulic torque converter, and a first exhaust port selectively connected to the sixth port;
- a valve spool including a first land on which the control pressure supplied to the first port is exerted, a second land selectively connecting the second port and the third port, a third land selectively connecting the fourth port to the seventh port or the eighth port, a fourth land, together with the third land, connecting the fourth port and the seventh port or the seventh port and the fifth port, a fifth land, together with the fourth land, selectively connecting the sixth port to the fifth port or the first exhaust port; and
- the elastic member disposed between the fifth land and the valve body.

13. The hydraulic control apparatus of claim 8, wherein the slip switch valve is controlled by the control pressure of the forward/reverse control solenoid valve and by control pressure counteracting against the control pressure of the forward/reverse control solenoid valve and supplied from an additional control pressure supply source.

14. The hydraulic control apparatus of claim 13, the slip switch valve comprises:
- a valve body including a first port connected to the forward/reverse control solenoid valve, a second port connected to the lock-up switch valve, a third port connected to the additional control pressure supply source, and a fourth port connected to the third hydraulic line of the hydraulic torque converter; and
- a valve spool including a first land on which the control pressure supplied to the first port is exerted, and a second land, together with the first land, connecting the second port and the fourth port and on which the control pressure supplied to the third port is exerted.

* * * * *